United States Patent
Lynch et al.

(10) Patent No.: US 6,807,785 B2
(45) Date of Patent: Oct. 26, 2004

(54) MOIRÉ CEILING PANELS

(75) Inventors: Diane Irene Lynch, Chicago, IL (US); Alan C. Wendt, Barrington, IL (US)

(73) Assignee: USG Interiors, Inc., Chicago, IL (US)

( * ) Notice: Subject to any disclaimer, the term of this patent is extended or adjusted under 35 U.S.C. 154(b) by 123 days.

(21) Appl. No.: 09/973,651

(22) Filed: Oct. 9, 2001

(65) Prior Publication Data

US 2003/0046890 A1 Mar. 13, 2003

Related U.S. Application Data

(63) Continuation-in-part of application No. 09/951,817, filed on Sep. 11, 2001.

(51) Int. Cl.[7] .............................. E04B 2/00; E04B 5/00; E04B 9/00
(52) U.S. Cl. ............................... 52/506.06; 52/506.07; 52/506.08; 52/39
(58) Field of Search .................. 52/506.06, 506.07, 52/506.08, 144, 475.1, 311.1, 630; 428/122

(56) References Cited

U.S. PATENT DOCUMENTS

| | | | |
|---|---|---|---|
| 1,021,058 A | | 3/1912 | Lempera |
| 2,966,954 A | * | 1/1961 | Sabine .................. 181/289 |
| 3,153,304 A | * | 10/1964 | Evengelista ............... 52/144 |
| 3,460,299 A | * | 8/1969 | Wilson .................. 52/144 |
| 3,922,073 A | * | 11/1975 | Schwartz ............... 350/319 |
| 4,189,888 A | * | 2/1980 | Blitzer, Jr. ............. 52/506.07 |
| 4,234,416 A | * | 11/1980 | Lower et al. ............ 209/247 |
| 4,300,068 A | | 11/1981 | Baird et al. |
| 4,709,308 A | * | 11/1987 | Makino .................. 362/148 |
| 4,941,074 A | * | 7/1990 | Decosse et al. ............ 362/61 |
| 5,050,360 A | * | 9/1991 | Gailey .................. 52/488 |
| 5,901,515 A | * | 5/1999 | Chen .................... 52/263 |
| 5,942,736 A | * | 8/1999 | Cortonesi ............... 181/289 |
| 6,209,726 B1 | * | 4/2001 | Gallia .................. 209/397 |
| 6,250,040 B1 | | 6/2001 | Green |
| 6,397,531 B1 | * | 6/2002 | Martin ................ 52/220.6 |
| 6,467,228 B1 | * | 10/2002 | Wendt et al. ........... 52/506.07 |

OTHER PUBLICATIONS

Panz Metal Ceiling Panels/Centricitee Suspension System, USG.
Knoll Imago Panel.

* cited by examiner

*Primary Examiner*—Carl D. Friedman
*Assistant Examiner*—Nahid Amiri
(74) *Attorney, Agent, or Firm*—Barnes & Thornburg

(57) ABSTRACT

The present invention relates to a ceiling panel for suspended ceiling systems that is designed to create a moiré effect when viewed from below. The moiré ceiling panels are designed to fit into a standard suspended ceiling grid and include a semi-transparent upper layer, a semi-transparent lower layer, and a light diffusing layer. The lower layer includes a surface with a plurality of openings to allow light from above the suspended ceiling to pass through. The upper layer also includes a surface with a plurality of openings and is connected to the lower layer to form the moiré panel. The light diffusing layer is connected to the upper panel and is design to intensify the moiré pattern while simultaneously concealing the area above the panel.

28 Claims, 6 Drawing Sheets

MOIRÉ CEILING PANELS

This application is a continuation-in-part of application Ser. No. 09/951,817 filed on Sep. 11, 2001.

BACKGROUND OF THE INVENTION

This invention relates generally to suspended ceiling systems and more particularly to a novel ceiling panel that is designed to create a moiré effect when viewed from below.

PRIOR ART

Suspended ceiling systems typically include grid members that provide for oppositely extending ceiling panel support flanges. The grid members are interconnected to form a grid and are suspended from the structure of a building with wire hangers. In these systems, the edges of the ceiling panels are installed by laying the panels in the grid opening created by the grid members. Once the ceiling panels are installed into the grid, a uniform ceiling surface is created. Typical suspended ceiling panels are manufactured from gypsum or slag wool fiber and are designed to conceal pipes, wiring and the like, while still allowing access to the concealed space above the ceiling. Typical ceiling panels are fabricated out of sound deadening and insulating material and are designed to meet fire safety codes. The acoustical panels have a uniform appearance and do little to enhance a room's déor. The acoustical panels also may include surface impressions and markings to enhance their appearance. Prior art panels do not provide for a ceiling panel that creates an aesthetically pleasing moiré pattern when viewed from below.

SUMMARY OF THE INVENTION

This invention may be described as a novel ceiling panel that is designed to create a moiré pattern on the panels when viewed from below. The moiré pattern is created when two spaced apart patterns overlap. Moiré patterns are created whenever one semitransparent object with a pattern is placed over another. When two patterns of lines, circles, slots, or arrays of dots are overlapped with imperfect alignment, the pattern of light and dark lines, called the moiré effect appears. The moiré pattern is not a pattern in the objects themselves, but rather a pattern in the image formed in your eye. In some places, black lines on the front object hide the clear lines on the rear screen, creating a dark area. Where the black lines on the front object align with black lines on the rear, the neighboring clear areas show through, leaving a light region. The patterns formed by the regions of dark and light are moiré patterns change as one moves about under the ceiling. The moiré panels can be fabricated out of a variety of materials including metal, polymer and fiberglass. The moiré panel is comprised of a semitransparent lower layer, a semitransparent upper layer and a light diffusing layer. The lower layer includes a surface with a plurality of apertures that allow light to pass through and is adapted to be connected to a ceiling grid. The upper layer also includes a plurality of apertures that allow light to pass through and is adapted to be connected to the lower layer. The light diffusing layer is positioned above the upper layer and is designed to intensify the moiré pattern while simultaneously concealing the area above the panel. The lower layer and upper layer are placed into the grid to form the panel. The moiré panels are designed to be inserted into and suspended from a ceiling grid system.

These and other aspects of this invention are illustrated in the accompanying drawings, and are more fully described in the following specification.

DETAILED DESCRIPTION OF THE INVENTION

While the present invention will be described fully hereinafter with reference to the accompanying drawings, in which a particular embodiment is shown, it is understood at the outset that persons skilled in the art may modify the invention herein described while still achieving the desired result of the invention. Accordingly, the description which follows is to be understood as a broad informative disclosure directed to persons skilled in the appropriate arts and not as limitations of the present invention.

The present invention is directed to a ceiling panel for a suspension ceiling system that when viewed displays a moiré effect. The moiré ceiling panel of the present invention is illustrated and described in the operational environment of a ceiling grid system as described herein but it is believed to have broad applications above and beyond the description of this preferred embodiment. The moiré panels may be used independently of the grid system and can be adapted to be applied to other areas of a structure such as interior walls.

Figure 1:
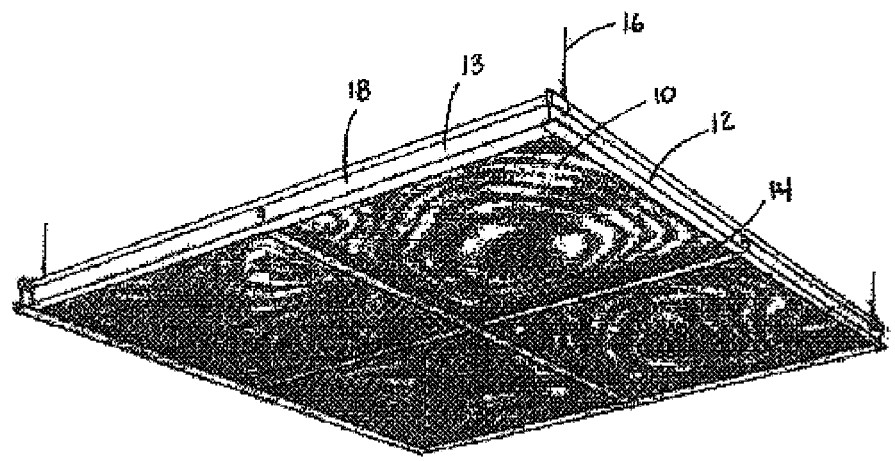
FIG. 1 is a perspective view of a moiré panel of the present invention attached to a ceiling grid system.

FIG. 1 illustrates a portion of an assembled suspension ceiling incorporating moiré ceiling panels 10 in accordance with the present invention. In such a ceiling panel system, grid members 12 are interconnected to form a grid structure 13. The grid members 12 are arranged to form openings 14 sized to receive the ceiling panels 10. The grid members 12 are suspended from the building structure by wire hangers 16 or other supporting devices.

To create the grid structure 13, a row of parallel evenly spaced grid members 12 are suspended by the wire hangers 16. Each row of the grid members 12 are spaced apart to accommodate the size of the moiré ceiling panels 10. To accommodate a 4 foot by 4 foot ceiling panel, the grid members 12 would be spaced apart four feet on center. The grid structure 13 also includes a second set of grid members 18 that are perpendicularly oriented in relation to the first set of grid members 12 to create the opening required for hanging the panels 10.

Figure 2:
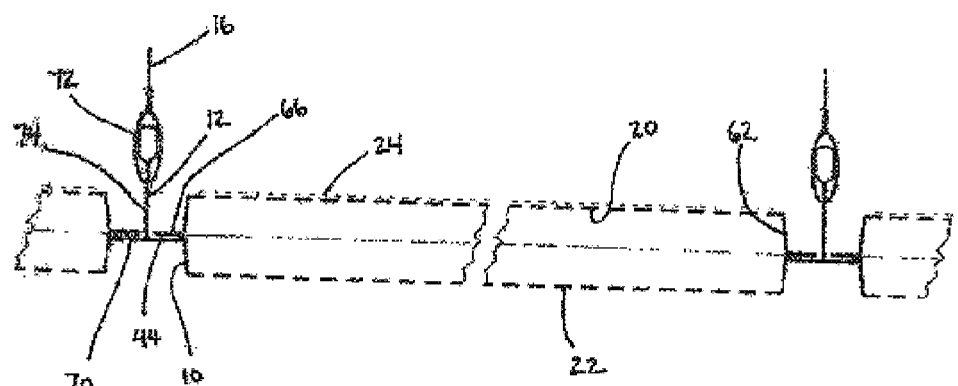
FIG. 2 is a cross section illustrating the position of the panels with respect to the grid members of the ceiling grid system.
Figure 3:
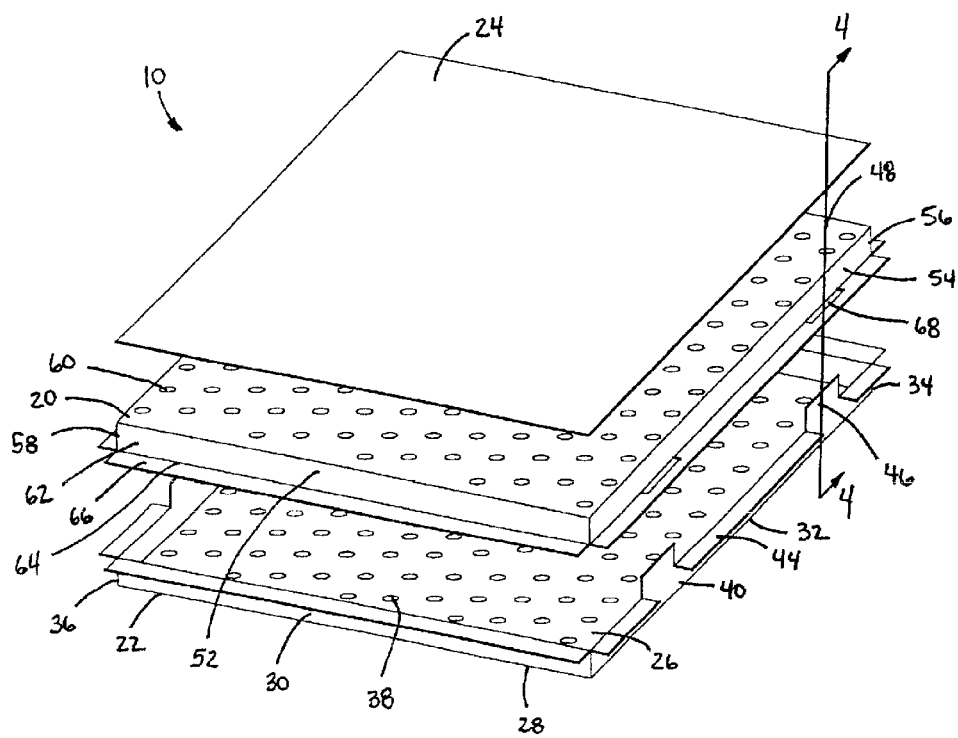
FIG. 3 is an exploded view of the moiré panel of the present invention.
Figure 4:
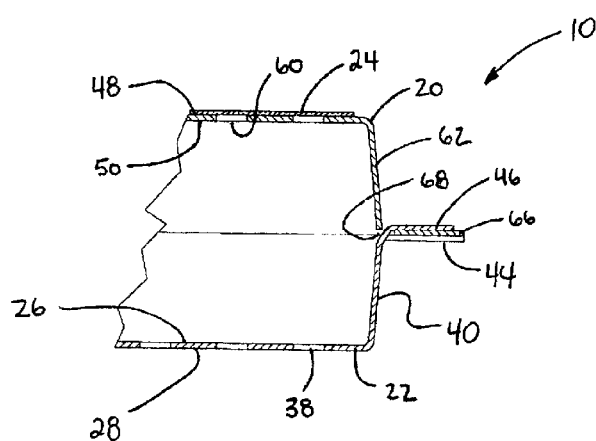
FIG. 4 is a cross sectional view of the moiré panel of FIG. 3, completely assembled, taken along lines 4—4.

The moiré ceiling panels 10 are normally square in shape and are typically made out of metal, such as steel, or aluminum but can be made out of other materials including plastic. Depending upon the ceiling design used, it may be desirable to shape the panels 10 into rectangular shapes but other shapes may be utilized. The moiré ceiling panels 10 include an upper layer 20, a lower layer 22 and a light diffusing layer 24 as shown in FIGS. 2–4. The lower layer 22 includes a top side 26, a bottom side 28 and four edges 30, 32, 34 and 36. The lower layer 22 also includes a plurality of apertures 38 that pass from the top side 26 through to the bottom side 28 of the lower layer 22 to allow light to pass through. The lighting can come from a variety of illuminating sources such as fluorescent, incandescent, and natural lighting. The apertures 38 are spaced apart and can be arranged in various patterns. The apertures 38 can also be of various shapes such as squares, slots and triangles, but round apertures are preferred. The apertures 38 are equally spaced apart but groupings and pattern arrangements can also be used. The diameter size of the apertures can be varied from about 0.120 inches to about 0.150 with a size of 0.140 inches being preferred to create the optimum moiré effect. This sizing of the apertures 38 is appropriate for a ceiling height of about eight to ten feet. Variations in ceiling height affect the size requirements for the apertures, with higher ceilings requiring larger apertures 38. The lower layer 22 also includes an upwardly extending flange 40 around the perimeter of the lower layer 22. Connected to an upper edge 42 of the flange 40 is an outwardly extending lip 44 that is adapted to be connected to the grid members 12. The lip 44 also includes upwardly extending tabs 46 that are designed to retain the upper layer 20.

The upper layer 20 shown best in FIGS. 3 and 4 includes a top side 48, a bottom side 50 and four edges 52, 54, 56, and 58. The upper layer 20 also includes a plurality of apertures 60 that pass from the top side 48 through to the bottom side 50 of the upper layer 20. The apertures 60 are evenly spaced apart and can be arranged in various patterns. The apertures 60 can also be of various shapes such as squares, slots and triangles, but round apertures are preferred. Also, the diameter size of the apertures can be varied from about 0.120 inches to about 0.150 with a size of 0.140 inches being preferred to create the optimum moiré pattern. The upper layer 20 also includes a downwardly extending flange 62 around the perimeter of the upper layer 20. Connected to a lower edge 64 of the flange 62 is an outwardly extending lip 66 that is adapted to be connected to the lip 44 of the lower layer 22. The lip 44 also includes slots 68 that are designed to accept the tabs 46 from the upper layer 20. When the upper layer 20 and the lower layer 22 are connected together, the tabs 46 are inserted through the slots 68 as shown in FIG. 4. Once inserted, the tabs 46 are bent outward locking the two layers 20 and 22 together. Alternatively, other fastening mechanisms can be used to connect the upper layer 20 and the lower layer 22 together such as clips, adhesive or other means known to those skilled in the art.

The light diffusing layer 24, as shown in FIG. 3, is designed to conceal the building structure that is above the ceiling grid system and is also designed to evenly diffuse the light illuminating from above the grid system enhancing the moiré effect. The light diffusing layer 24 is attached to the top side 48 of the upper layer 20 by use of an adhesive and covers all of the apertures 60. The light diffusing layer 24 can be made out of a paper, plastic or an acoustical sound backer fabric such as ACOUSTIBOND™ fabric. The acoustical sound backer fabric not only diffuses the light illuminating above the panel, but it also dampens sound. Alternatively, the light diffusing layer 24 can be attached to the bottom side 50 of the upper layer 20 but this arrangement slightly reduces the moiré effect.

FIG. 2 is a typical cross section of FIG. 1 and shows the grid members 12 and the lips 44 and 66 of the upper layer 20 and lower layer 22 resting upon a base portion 70 of the grid members 12. The grid member 12 is typically fabricated out of die-formed sheet metal or extruded aluminum. The grid member 12 after fabrication includes a bulb portion 72, a bridge portion 74 and the base portion 70. The overall shape of the grid member 12 is designed to give the member 12 strength to prevent flexing. Typically, apertures (not shown) are placed along the length of the bridge portion 74 so that wire hangers 16 can be threaded through and wrapped around the bulb portion 72. Once the grid members 12 are in place, the moiré ceiling panels 10 can be inserted through the openings 14 created by the grid members 12. The moiré ceiling panels 10 are designed to rest upon the grid members 12 and can be removed by pushing up on the panel 10 and sliding it through the opening 14 allowing access to the area above the grid system.

FIG. 3 is an exploded view of the of the moiré ceiling panel 10 showing the lower layer 22, the upper layer 20 and the light diffusing layer 24 before interconnection. As can be seen from FIG. 3 and FIG. 4, the apertures 38 on the upper layer 20 are spaced apart from the apertures 60 on the lower layer 22 by approximately one inch. The distance between the layers 20 and 22 can be varied, which alters the effect. Ceiling height and light intensity from above the panel 10 also varies the moiré effect. The natural distortion or oil canning of the metal panels 10 renders a different pattern on each moiré ceiling panel 10 as can be seen from FIG. 1. Also shown in FIG. 3 are the tabs 46 on the lower layer 22 that engage the slots 68 on the upper layer 20 to interlock the two layers to form the moiré ceiling panel 10.

FIG. 4 is a cross section of the moiré ceiling panel taken along line 4—4 of FIG. 3 and illustrates an assembled moiré ceiling panel 10 with the tab 46 inserted through the slot 68 and bent outward to lock the upper layer 20 and the lower layer 22 together. The apertures 38 on the lower layer 22 are spaced apart from the apertures 60 on the upper layer 20 so the arrays of apertures are randomly overlapped creating the pattern of light and dark lines or moiré effect. As an observer looks up and views the bottom side 28 of the lower layer 22 their line of sight is carried through the apertures 38 to the bottom side 50 of the upper layer 20. Due to the orientation of the apertures 38 and 60, the observer cannot see light through all of the apertures 38 of the lower layer 22 at the same time and thereby sees varying light and dark areas as shown in FIG. 1.

Figure 5:
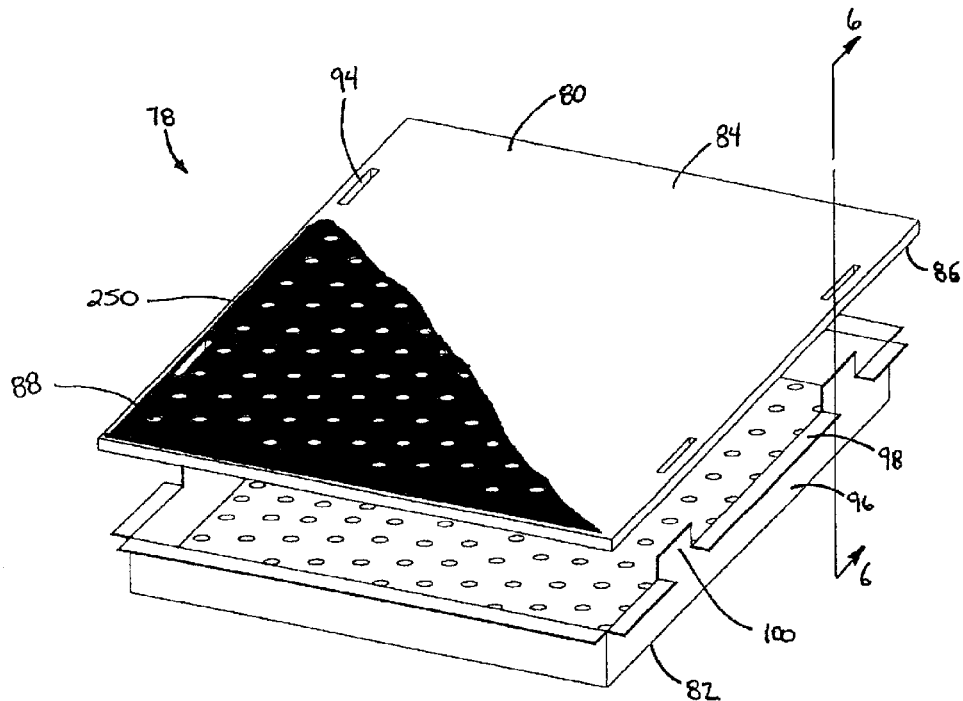
FIG. 5 is an exploded view of a first alternate embodiment of the moiré panel of the present invention.

FIG. 5 is an exploded view of the alternate embodiment of a moiré ceiling panel 78. The moiré ceiling panel 78 includes an upper layer 80 and a lower layer 82. The upper layer 80 is made from a plastic such as LEXAN® and while it is light penetrating, it cannot be seen through. If a see through panel is used, a light diffusing layer must be used. The upper layer 80 has a top side 84 and a bottom side 86. The upper layer 80 includes a printed film layer 250 that is adhered to the top side 84 or the bottom side 86 of the upper layer 80. Alternatively, the upper layer 80 can be directly printed or coated to create the light and dark regions. The film layer 250 is printed to cover up a large portion of the layer 250 and includes unprinted areas 88 that can be of various shapes including round, square, slots, triangular and other shapes known to those skilled in the art. The unprinted areas 88 can be equally spaced apart or arranged in groupings and patterns. Alternatively, apertures can be used in place of the unprinted areas although a light diffusing layer would need to be used. The upper layer also includes slots 94 located along the perimeter for connection to the lower layer 82.

The lower layer 82 includes an upwardly extending flange 96 and an outwardly extending lip 98 that is adapted to support the upper layer 80. The lip 98 also includes several upwardly extending tabs 100 that are adapted to connect to and retain the slots 94 of the upper member. The lower layer 82 also includes evenly spaced apertures 95 that allow light to pass through.

Figure 6:
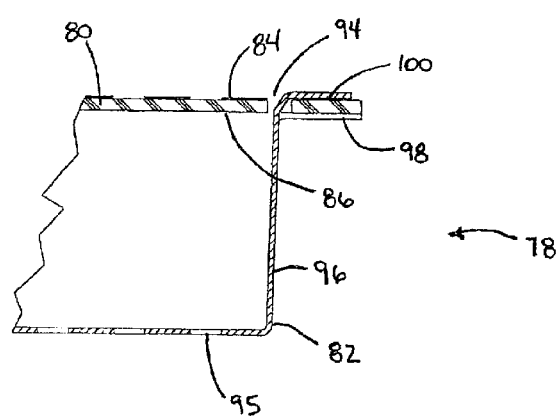
FIG. 6 is a cross sectional view of the moiré panel of FIG. 5, completely assembled, taken along lines 6—6.

FIG. 6 is a cross sectional view of FIG. 5 taken along line 6—6 and illustrates the moiré ceiling panel 78 fully assembled. To form the panel 78 the tab 100 is inserted through the slot 94 and bent outward to lock the upper layer 80 and the lower layer 82 together. The panel 78 can also be inserted into the opening 14 formed by grid members 12 and 18 and is supported by the base portion 70.

Figure 7:
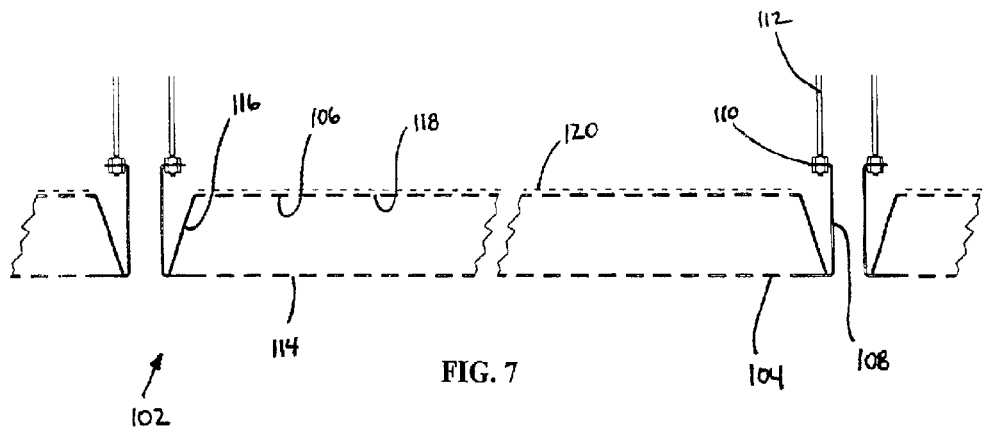
FIG. 7 is a cross sectional view of an alternate embodiment of moiré panel suspended from a structure without a grid.

FIG. 7 is another embodiment of a moiré ceiling panel 102 that is designed to be suspended from the building structure without the need for a ceiling grid. The moiré ceiling panel includes a lower layer 104 and an upper layer 106. The lower layer 104 includes upwardly extending side walls 108 that include inwardly extending flanges 110. The flanges 110 are adapted to be connected to suspension wires or rods 112, which suspend the lower layer 104 from the building structure. The lower layer 104 also includes a plurality of apertures 114 that can be of various shapes and sizes as previously described, to allow light to pass through.

The upper layer 106 is sized to fit between the side walls 108 of the lower layer 104. The upper layer 106 includes at least two downwardly extending legs 116 that support the upper layer 106 about one inch apart from the lower layer 104. The upper layer 106 further includes a plurality of apertures 118 that allow light illuminating from above the panel 102 to pass through. In order to obtain the proper moiré effect a light diffusing layer 120 is positioned above the upper layer 106. With this arrangement, large panels 102 can be suspended from a building structure without the need to support the panel 102 with a grid system. The panel 102 would create a floating appearance as it is supported by the building structure.

Figure 8:
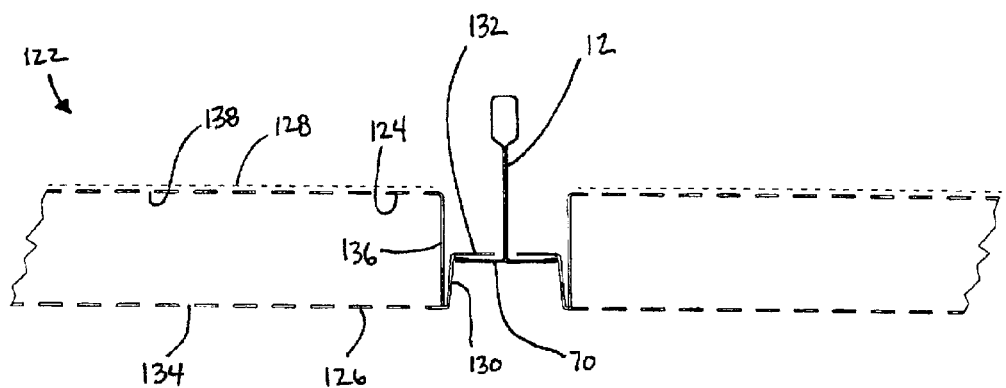
FIG. 8 is a cross sectional view of an alternative embodiment of moiré panel of the present invention.

FIG. 8 is a cross section of another embodiment of a moiré ceiling panel 122 that includes an upper layer 124, a lower layer 126 and a light diffusion layer 128. The lower layer 126 includes an upwardly extending flange 130 and an outwardly extending lip 132. The outwardly extending lip 132 is adapted to be connected to and supported by the base portion 70 of the grid members 12. The lower layer 126 also includes a plurality of apertures 134 that are spaced apart across the lower layer 126 and are adapted to allow light illuminating from above the panel 122 to pass through.

The upper layer 124 of the moiré ceiling panel 122 includes a downwardly extending flange 136 that is adapted to be connected to the lower layer 126 by use of fasteners, adhesive or other means known to those skilled in the art. The upper layer 124 is sized so that when connected with the lower layer 126 the flange 136 rests inside the flange 130 of the lower layer 126. The upper layer 124 also includes apertures 138 that allow light to pass through to the lower layer 126. The light diffusing layer 128 is positioned above the upper layer 124.

Figure 9:
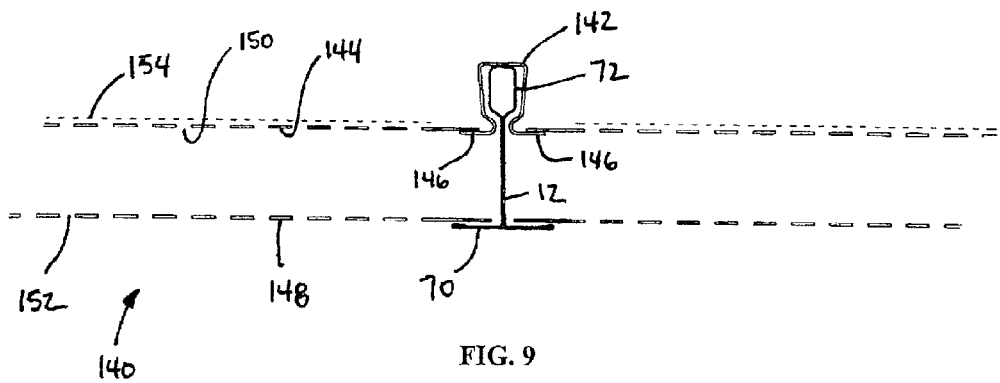
FIG. 9 is a cross-sectional view of an alternative embodiment of the moiré panel of the present invention.

FIG. 9 is a cross section of another embodiment of a moiré ceiling infill 140 that incorporates a grid clip or spline 142 designed to support an upper layer 144 of the infill 140. An infill 140, as shown in FIG. 9, is a member designed to fill an opening in the grid that is not necessarily a unitary panel. A lower layer 148 is adapted to be connected to the base portion 70 of the grid member 12. In this embodiment, the upper layer 144 does not contact the lower layer 148. The grid clip or spline 142 is a c-shaped member that is designed to fit over the bulb portion 72 of the grid members 12. The grid clip 142 includes two outwardly extending supports 146 that provide a support surface for the upper layer 144. The upper layer 144 is fabricated from flat sheet metal or plastic and includes a plurality of apertures 150. If a plastic material is used, it is printed to cover up a large portion of the upper layer 144 and would include unprinted areas of various shapes. Alternatively, a printed film layer can be laminated to the upper layer 144 to produce the desired effect. The lower layer 148 is also fabricated from flat sheet metal or plastic and includes a plurality of apertures 152. The moiré ceiling infill 140 also includes a light diffusing layer 154 that is attached to the upper layer 144 to diffuse the light evenly across the upper layer 144 and to conceal the area above the infill 140.

Figure 10:
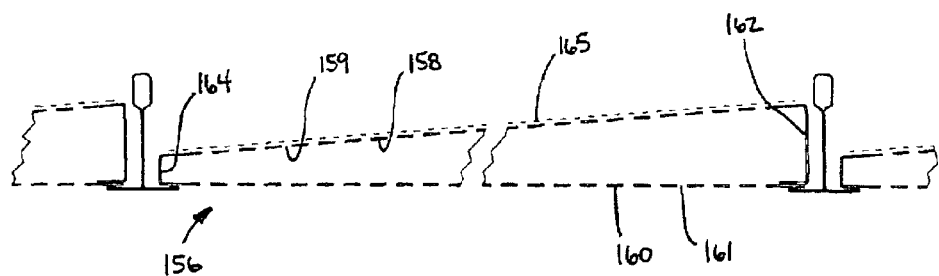
FIG. 10 is a cross-sectional view of an alternative embodiment of the moiré panel of the present invention.

FIG. 10 is a cross section of another embodiment of a moiré ceiling panel 156 that incorporates an upper layer 158 that is angled in relation to a lower layer 160 varying the moiré effect across the panel 156. Alternatively, the upper layer 158 and the lower layer 160 can be curved in relation to each other to vary the moiré effect. The lower layer includes a plurality of apertures 161 adapted to allow light to pass through. The upper layer 158 includes a plurality of apertures 159, a first downwardly extending leg 162 and a second downwardly extending leg 164 wherein the first leg 162 is longer than the second leg 164, offsetting the upper layer 158 from the lower layer 160. The offset upper layer 158 varies the moiré effect across the panel 156 as viewed from below. The moiré panel 156 also includes a light diffusing layer 165 positioned above the upper layer 158.

Figure 11:
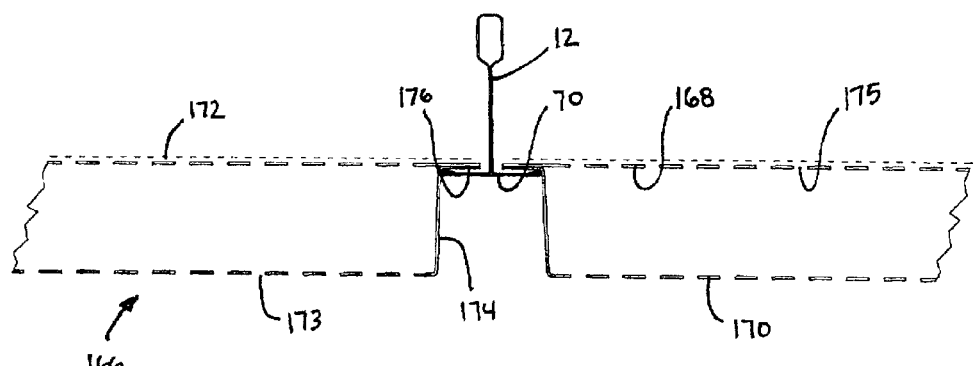
FIG. 11 is a cross-sectional view of an alternative embodiment of the moiré panel of the present invention.

FIG. 11 is a cross section of another embodiment of a moiré ceiling panel 166 that includes a flat upper layer 168, a tray shaped lower layer 170 and a light diffusing layer 172 positioned above said upper layer 168. The lower layer 170 includes a plurality of apertures 173, an upwardly extending flange 174 and an outwardly extending lip 176. The lip 176 of the lower layer 170 is designed to rest upon the base portion 70 of the grid members 12. The upper layer 168 also includes apertures 175 and is connected to the lip 176 of the lower layer 170 to form the moiré ceiling panel 166.

Figure 12:
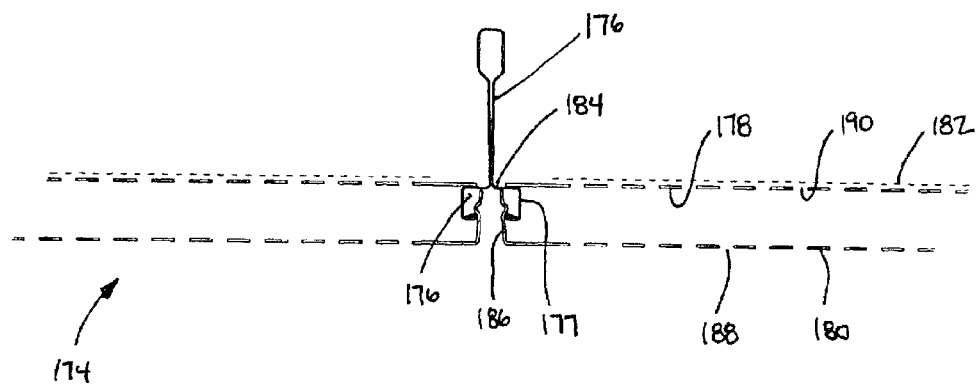
FIG. 12 is a cross-sectional view of an alternative embodiment of the moiré panel of the present invention.

FIG. 12 is a cross section of another embodiment of a moiré ceiling infill 174 for use with a channel type grid member 176. The infill 174 includes a relatively flat upper layer 178 that is designed to be placed upon a top portion 184 of a channel 177 of the grid member 176. The upper layer 178 includes apertures 190 or other openings across the surface of the layer 178 to allow light to pass through. Alternatively, the upper layer 178 can be made from a plastic and covered with a printed film layer (not shown). The infill 174 further includes a lower layer 180 and a light diffusing layer 182. The lower layer 180 includes an upwardly extending leg 186 that is adapted to be connected inside the channel 176 and includes a plurality of apertures 188 to allow light to pass through. The leg 186 retains the lower layer 180 to the grid member 176. This arrangement allows a reduction in the space between panels 174 to create a more uniform ceiling appearance.

Figure 13:
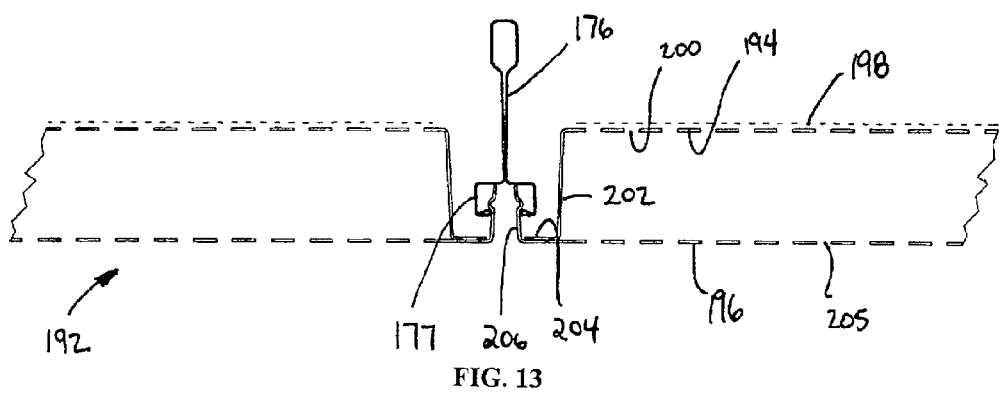
FIG. 13 is a cross-sectional view of an alternative embodiment of the moiré panel of the present invention.

FIG. 13 is a cross section of another embodiment of a moiré ceiling panel 192 that is designed to be used with the channel type grid member 176. The panel 192 includes an upper layer 194 a lower layer 196 and a light diffusing layer 198. The upper layer 194 includes a plurality of apertures 200 across its surface and further includes a downwardly extending flange 202 and an outwardly extending lip 204. The lip 204 is adapted to be fastened to the lower layer 196 to create the panel 192. The lower layer 196 has a plurality of apertures 205 across its surface and includes an upwardly extending leg 206 that is adapted to retain the panel 192 to the channel 177 of the grid members 176.

Figure 14:
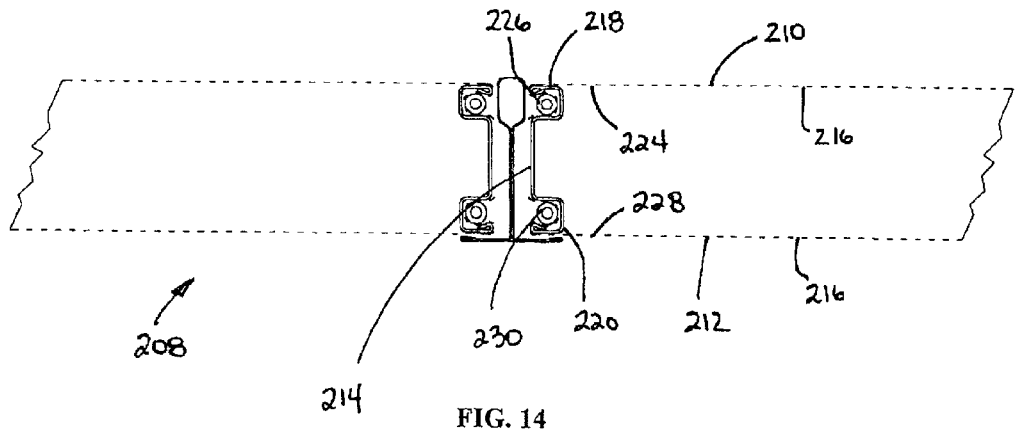
FIG. 14 is a cross-sectional view of an alternative embodiment of the moiré panel of the present invention.

FIG. 14 is a cross section of another embodiment of a moiré ceiling panel 208 that is comprised of a upper layer 210 a lower layer 212 and a frame 214. The upper and lower layers 210 and 212 are a woven mesh or screen type material that contain openings 216 large enough to see light through. Alternatively, a printed mylar plastic film may be used in place of the woven mesh or screen type material. The frame 214 is designed to retain the upper and lower layers 210 and 212 and includes an upper channel 218, and a lower channel 220. The upper channel 218 is adapted to accept an edge 224 of the upper layer 210. The edge 224 of the upper layer 210 is retained by use of a spline 226 that locks the upper layer 210 into the upper channel 218. The lower channel 220 is adapted to accept an edge 228 of the lower layer 212. The edge 228 of the lower layer 212 is retained by use of a spline 230 that locks the lower layer 212 into the lower channel 220. The assembled panel 208 can be installed and removed from the grid members 12 to allow access above the grid system.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A bi-level ceiling panel for creating a moiré effect comprising:
    an opaque layer having a plurality of openings, distributed substantially throughout said opaque layer, adapted to allow light to pass therethrough;
    a translucent layer attached to said opaque layer, said translucent layer adapted to allow light to pass therethrough; and
    said opaque layer is spaced apart from said translucent layer to create a gap between said layers.

2. The bi-level ceiling panel of claim 1, wherein said translucent layer includes a coating.

3. The bi-level ceiling panel of claim 2, wherein said coating is an opaque film.

4. The bi-level ceiling panel of claim 3, wherein said film is laminated to said translucent layer.

5. The bi-level ceiling panel of claim 4, wherein said coating includes coated and uncoated areas, said uncoated areas adapted to allow light to pass therethrough.

6. The bi-level ceiling panel of claim 1, wherein said opaque layer includes an upwardly extending flange along an edge of said opaque layer.

7. The bi-level ceiling panel of claim 6, wherein said flange includes an outwardly extending lip adapted to be connected to a suspension ceiling grid.

8. The bi-level ceiling panel of claim 7, wherein said flange further includes upwardly extending tabs.

9. The bi-level ceiling panel of claim 8, wherein said translucent layer includes slots adapted to be connected with said tabs.

10. A bi-level ceiling infill for creating a moiré effect comprising:
    an opaque layer having a plurality of openings, distributed substantially throughout said opaque layer, adapted to allow light to pass therethrough; said opaque layer adapted to be connected to a ceiling grid;
    a translucent layer spaced apart from said opaque layer and adapted to be connected to said ceiling grid, said translucent layer adapted to allow light to pass therethrough.

11. The bi-level ceiling panel of claim 10, wherein said translucent layer includes a coating.

12. The bi-level ceiling panel of claim 11, wherein said coating is an opaque film.

13. The bi-level ceiling panel of claim 12, wherein said film is laminated to said translucent layer.

14. The bi-level ceiling panel of claim 13, wherein said coating includes coated and uncoated areas, said uncoated areas adapted to allow light to pass therethrough.

15. A suspension ceiling system for creating a moiré effect comprising:
    a plurality of grid members intersecting to form a grid;
    an illuminating source positioned above said grid;
    an opaque layer adapted to engage said grid members, said opaque layer including a plurality of openings adapted to allow light to pass therethrough;
    a translucent layer spaced apart from said opaque layer and adapted to engage said grid members.

16. The bi-level ceiling panel of claim 15, wherein said translucent layer includes a coating.

17. The bi-level ceiling panel of claim 16, wherein said coating is an opaque film.

18. The bi-level ceiling panel of claim 17, wherein said film is laminated to said translucent layer.

19. The bi-level ceiling panel of claim 18, wherein said coating includes coated and uncoated areas, said uncoated areas adapted to allow light to pass therethrough.

20. A suspension ceiling system for creating a moiré effect comprising:
    a plurality of grid members intersecting to form a grid;
    an illuminating source positioned above said grid;
    a panel frame adapted to be connected to said grid;
    a first layer connected to said panel frame, said first layer having light blocking regions and light passable regions distributed substantially throughout said first layer, said light passable regions allow light from said illuminating source to pass through; and
    a second layer connected to said panel frame and spaced apart from said first layer, said
    second layer having light blocking regions and light passable regions distributed
    substantially throughout said second layer, said light passable regions allow light from said illuminating source to pass through.

21. The suspension ceiling system of claim 20, wherein said panel frame includes a first channel and a second channel.

22. The suspension ceiling system of claim 21, wherein said first layer is connected to said first channel.

23. The suspension ceiling system of claim 22, wherein said first channel includes a spline to secure said first layer to said first channel.

24. The suspension ceiling system of claim 21, wherein said second layer is connected to said second channel.

25. The suspension ceiling system of claim 24, wherein said second channel includes a spline to secure said second layer to said second channel.

26. The suspension ceiling system of claim 20, wherein said first layer and second layer are made from a polymer film.

27. The suspension ceiling system of claim 26, wherein said polymer film is printed to form said light blocking regions and said light passable regions.

28. A bi-level ceiling panel for creating a moiré effect comprising:

an opaque layer having a plurality of openings, distributed substantially throughout said opaque layer, adapted to allow light to pass therethrough, said opaque layer includes an upwardly extending flange along an edge of said opaque layer;

said flange including upwardly extending tabs and an outwardly extending lip adapted to be connected to a suspension ceiling grid;

a translucent layer attached to said opaque layer, said translucent layer adapted to allow light to pass therethrough, said translucent layer including slots adapted to be connected with said tabs; and said opaque layer is spaced apart from said translucent layer to create a gap between said layers.

* * * * *

UNITED STATES PATENT AND TRADEMARK OFFICE
CERTIFICATE OF CORRECTION

PATENT NO. : 6,807,785 B2　　　　　　　　　　　　　　　　　　　　　　Page 1 of 1
DATED : October 5, 2004
INVENTOR(S) : Diane Irene Lynch and Alan C. Wendt It is certified that error appears in the above-identified patent and that said Letters Patent is hereby corrected as shown below:

Title page,
Item [74], *Attorney, Agent, or Firm*, please add:
-- Michael M. Geoffrey; David F. Janci. --

Signed and Sealed this

Twenty-second Day of February, 2005

JON W. DUDAS
*Director of the United States Patent and Trademark Office*